Nov. 25, 1969  O. BLASCHEK  3,480,351
CASSETTES AND CAMERAS EQUIPPED THEREWITH
Filed June 27, 1968

INVENTOR
OTTO BLASCHEK

BY Stevens, Davis, Miller & Mosher
ATTORNEYS

United States Patent Office 3,480,351
Patented Nov. 25, 1969

3,480,351
CASSETTES AND CAMERAS EQUIPPED THEREWITH
Otto Blaschek, Munich, Germany, assignor to Arnold & Richter KG, Munich, Germany
Continuation-in-part of application Ser. No. 457,071, May 18, 1965. This application June 27, 1968, Ser. No. 740,706
Claims priority, application Germany, May 27, 1964, A 46,153
Int. Cl. G03b 31/00, 23/02
U.S. Cl. 352—35                                                   7 Claims

ABSTRACT OF THE DISCLOSURE

A cassette for motion picture cameras including means for sound damping noise generated by the film advancing means and comprising a cassette, a support member mounted in the cassette by means of a noise-insulating, light-tight buffer means, and noise producing, film advancing elements mounted on the support member.

---

Figure 1:
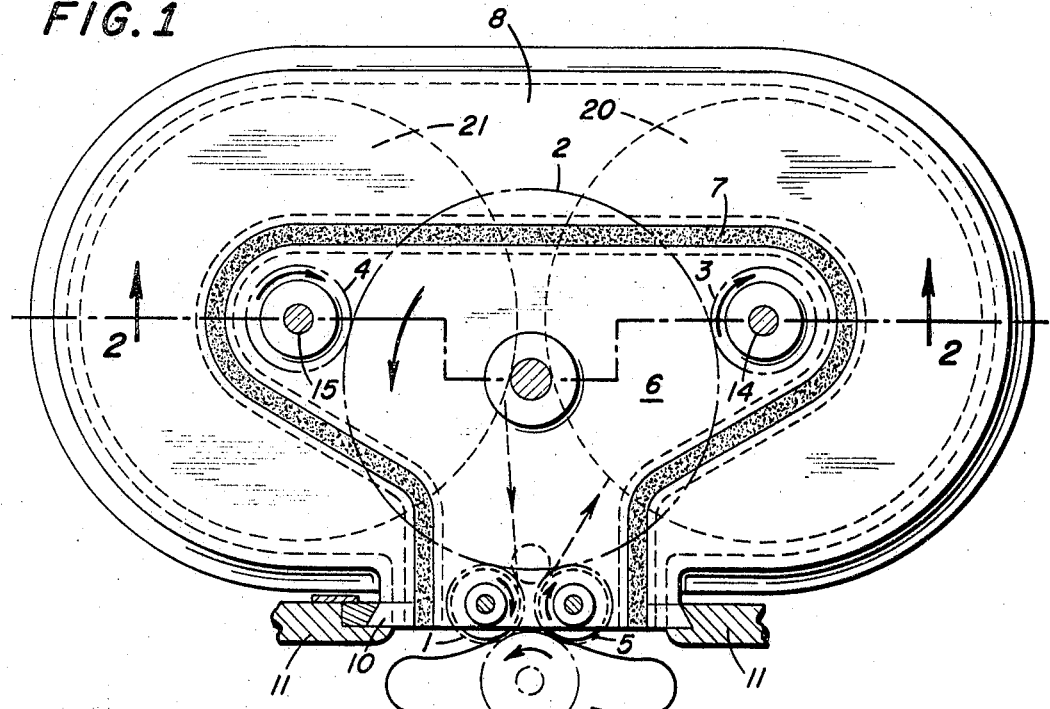

The present application is a continuation-in-part of my application Ser. No. 457,071 filed May 18, 1965.

The present invention relates to an improvement in or modification of the invention disclosed in applicant's application Ser. No. 434,239 filed Feb. 23, 1965, now Patent No. 3,331,653.

For ease of reference, it should be mentioned that the aforesaid patent broadly concerns a motion picture camera wherein the parts which are noisy in operation are mounted in a housing by means of sound-damping buffers. The camera may include an exchangeable objective also mounted in the housing by sound-damping buffers, preferably in a sleeve forming an extension of a casing surrounding the camera mechanism. The sleeve is preferably provided with a window at one end and is locked to the casing at the other end, the objective being locked to the camera mechanism. The objective and the sleeve conveniently form a unit and the sleeve has means for adjusting the focus, iris diaphragm and possibly the focal length of the objective. In addition to at least one window for viewing the scales marked on the objective, the sleeve may have magnified replicas of the graduations on the objective. For the purpose of relieving the sound-damping buffers between the objective and sleeve from unnecessary stresses when the objective is being changed, means may be provided for temporarily locking the objective and sleeve against relative rotation. Certain other important features will readily appear from the description, claims and drawings of said patent.

Although the above-mentioned patent protects and generally discloses the feature of noise-suppression in motion picture cameras and parts thereof by means of any convenient form of sound-damping buffers, it was thought that the most convenient form for such buffers was the one specifically illustrated and described in the patent, namely a rubber cushion bonded between two metal mounting plates. It has now been discovered that the concept underlying the invention of the said patent can be embodied in other forms.

According to one aspect of the present invention the sound-damping buffers are constituted by a mass of vulcanized material. Thus, the parts of the camera which generate noise or one or more supports for these noisy parts can be vulcanized, by means of a vulcanizable material, to the casing that surrounds the camera mechanism. Similarly, the objective or at least one support therefor can be vulcanized to the sleeve by the vulcanizable material.

According to another aspect of the present invention, the concept underlying the invention of said patent can be applied to a cassette in which the noisy parts or one or more supports therefor are mounted in an enclosure by means of sound-damping buffers which are either in the form disclosed in said patent or are constituted by a mass of vulcanized material as proposed above. In this way it can be ensured that the low noise property of the camera is not detrimentally influenced either by noises emanating from the cassette or by noise that could be transmitted from the camera mechanism through the cassette gearing with which the camera mechanism is coupled and out through the cassette enclosure. If the buffers for the cassette are in the form disclosed in said patent, a labyrinth seal should be provided to make the cassette light-proof but if the buffers are constituted by a vulcanized mass then such mass will also provide a light-proof seal.

In one form of the present invention, the cassette enclosure comprises a support portion to which all the noisy parts of the cassette are connected, said support portion being vulcanized into a cutout in the enclosure. Preferably, the support portion is formed by severing some of the enclosure material to form the cutout and vulcanizing it back into the cutout. Such a construction is space saving. In order to ensure that substantially no noise will be transmitted through the cover member for the cassette gears, the cover member is mounted on the enclosure beyond the confines of the support portion thereof.

It will be evident that, when applied to cassettes, the invention represents a considerable improvement in prior constructions where noise suppression was ineffectively attempted by providing the cassette enclosure with inner and/or outer sound absorbing materials.

Figure 2:
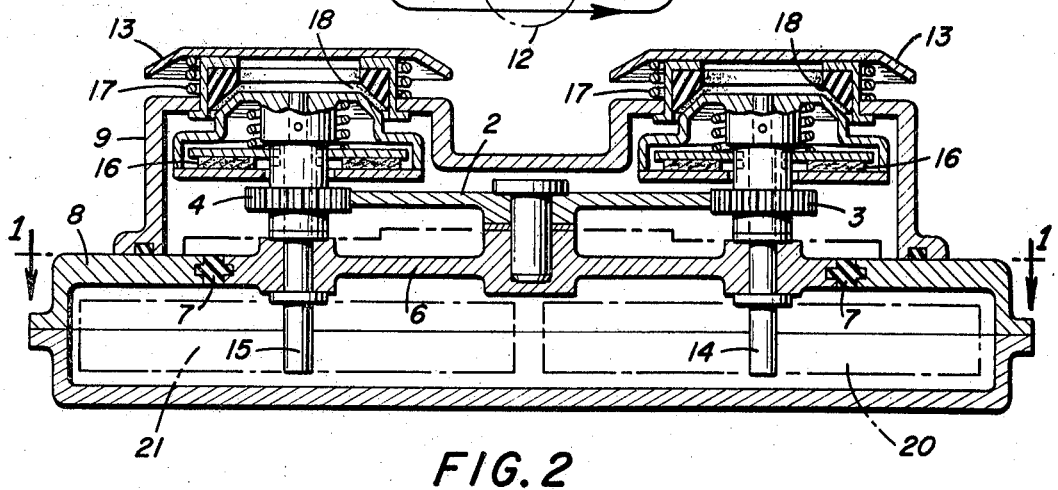

The means for accomplishing the foregoing objects and other advantages, which will be apparent to those skilled in the art, are set forth in the following specification and claims, and are illustrated in the accompanying drawings dealing with a basic embodiment of the present invention. Reference is made now to the drawings in which:

FIG. 1 is a diagrammatic plan view of a cassette employing the invention with the cover member being broken away on the right-hand side; and FIG. 2 is a transverse vertical sectional view taken along line 2—2 of FIG. 1.

The gears 1 to 5 of the cassette gearing, i.e. all the noise producing film advancing components, are mounted on a support member 6. Such support member is vulcanized into a cutout formed in a cassette enclosure 8 by means of a sound-damping and light-proofing buffer 7. The support member 6 thus forms a continuation of the enclosure and is generally coplanar therewith (refer to FIG. 2).

As mentioned above, a convenient and preferable way in which to form the support member 6 is to first form the enclosure 8 and then cut the support member from one portion thereof. This method eliminates the need for matching of shapes and should provide adequate spacing for the sound buffer when the member is mounted in the enclosure.

The buffer 7 may be of any known material but must have the properties of sound-damping and light-proofing and be capable of being bonded to the enclosure and the support member.

The cover member 9, for the gears 1 to 5, is secured to the enclosure 8 beyond the periphery of the support member 6. This ensures that little or no noise will be transmitted through the cover member 9.

A connector member 10 shown in a dovetail configuration, is formed on the enclosure 8 and serves to secure the cassette to the casing 11 of the camera with the drive gear 12 in engagement with the casette gears 1 and 5.

The cover member 9 is provided with spring biased adjusting knobs 13 for the film wind-up and pay-out spindles.

As may be noted from the figures, especially FIG. 2, many of the features of the film advancing mechanism per se are of the known type, for example the winding shaft 14 for exposed film spool 20 and unwinding shaft 15 for the film supply spool 21. A friction drive means 16 is desirable in order to selectively actuate these winding shafts from the outside of the cassette for adjusting the feed of the film since, after stopping the drive means, the film take-up spool may move backwards somewhat forming undesirable loops of film. In order to allow the film to be properly positioned adjustment knobs 13, spring biased by springs 17 to normally be out of engagement with drive means 16, are provided on each of the winding shafts. In order to effect tightening or positioning of the film the knobs 13 must be pressed against the spring 17 to engage with the friction drive means 16 of the selected winding shaft. This arrangement also assists in noise damping since, in the non-actuated position, the knobs 13 are spaced from the friction drive means 16 with an air gap 18 therebetween.

I claim:

1. A cassette for silent operating motion picture cameras comprising a cassette enclosure having a cutout formed therein, a support member of substantially the same configuration as said cutout, a pair of film spools rotatably mounted on said support member within said enclosure for feeding and taking up film, gearing means mounted on said support member for driving said spools and cooperation with a camera drive means, and a noise-insulating, light-tight buffer means securing said support member to said cutout in said enclosure.

2. A cassette according to claim 1 further comprising a cover fastened to the outside of the cassette enclosure beyond the periphery of said support member to enclose the gearing means.

3. A cassette according to claim 2 further comprising a spring biased adjustment knob for each of said film spools, said knobs being mounted on said cover.

4. A cassette according to claim 3 in which said knobs are normally spaced from said spools with an air gap therebetween whereby transmission of noise will be prevented.

5. A cassette according to claim 1 further comprising dovetail connecting means formed on said cassette enclosure for the attachment of the cassette to said camera.

6. A cassette according to claim 1 in which said buffer means comprises a resilient cushion bonded between said support member and said enclosure.

7. A cassette according to claim 1 in which said buffer means comprises a mass of vulcanized material.

References Cited

UNITED STATES PATENTS

| | | | |
|---|---|---|---|
| 1,863,066 | 6/1932 | Owens | 352—75 |
| 2,088,714 | 8/1937 | Mitchell | 352—35 |
| 2,180,683 | 11/1939 | Laube et al. | 352—35 |
| 2,855,826 | 10/1958 | Jayet. | |

JULIA E. COINER, Primary Examiner

U.S. Cl. X.R.

352—78